US007135537B2

(12) United States Patent
Hofmann

(10) Patent No.: US 7,135,537 B2
(45) Date of Patent: Nov. 14, 2006

(54) SULFONIMIDE-CONTAINING POLY(ARYLENE ETHER)S AND POLY(ARYLENE ETHER SULFONE)S, METHODS FOR PRODUCING THE SAME, AND USES THEREOF

(75) Inventor: Michael A. Hofmann, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 7 days.

(21) Appl. No.: 10/833,786

(22) Filed: Apr. 28, 2004

(65) Prior Publication Data

US 2004/0236062 A1 Nov. 25, 2004

Related U.S. Application Data

(60) Provisional application No. 60/467,094, filed on May 1, 2003.

(51) Int. Cl.
*C08G 75/30* (2006.01)
*H01M 8/10* (2006.01)

(52) U.S. Cl. ............ 528/99; 528/92; 528/102; 528/171; 528/391; 528/422; 528/488; 429/33; 429/46

(58) Field of Classification Search .......... 528/171, 528/86, 92, 95, 99, 102, 391, 422, 488; 429/33, 429/46
See application file for complete search history.

(56) References Cited

U.S. PATENT DOCUMENTS

| 5,514,493 | A | 5/1996 | Waddell et al. |
| 5,874,616 | A | 2/1999 | Howells et al. |
| 5,962,546 | A | 10/1999 | Everaerts et al. |
| 6,063,522 | A | 5/2000 | Hamrock et al. |
| 6,420,607 | B1 | 7/2002 | Hamrock et al. |
| 6,727,386 | B1* | 4/2004 | Hamrock ............ 564/82 |

FOREIGN PATENT DOCUMENTS

| WO | WO 97/23448 | 7/1997 |
| WO | WO 97/35929 | 10/1997 |
| WO | WO 98/50349 | 11/1998 |

OTHER PUBLICATIONS

Noshay et. al., Sulfonated Polysulfone, Journal of Applied Polymer Science, 1976, pp. 1885-1903, vol. 20.
Wang et. al., Direct Polymerization of Sulfonated Poly (Arylene Ether Sulfone) Random (Statistical) Copolymers: Candidates for New Proton Exchange Membranes, Journal of Membrane Science, 2002, pp. 231-242, vol. 197.
Wang et. al., Synthesis of Highly Sulfonated Poly (Arylene Ether Sulfone) Random (Statistical) Copolymers via Direct Polymerization, Macromol. Symp., 2001, pp. 387-395, vol. 175.
Ford et al., New Sulfonimide Acid Containing Perfluorocyclobutane (PFCB) Aromatic Polyethers for Potential use in Fuel Cell Applications, Polymeric Materials Science and Engineering, 2000, pp. 25-26, vol. 83.
Ford et. al., New Aromatic Perfluorovinyl Ether Monomers Containing the Sulfonimide Acid Functionality, Polymeric Materials Science and Engineering, 2000, pp. 10-11, vol. 83.
Hofmann et. al., Synthesis of Polyphosphazenes with Sulfonimide Side Groups, Macromolecules, 2002, pp. 6490-6493, vol. 35.
Yagupol'Skii et. al., Trifluoromethylsulfonylimino and Bis (Trifluoromethylsuflonylimino) Derivatives of Arenesulfonic Acids.
Qiu et. al., A Useful Synthesis of W-Iodoperfluoroalkanesulfonyl Fluorides and Perfluoroalkane-A,W-Bis-Sulfonyl Fluorides.
J.E. McGrath et. al., Ion-Conducting Sulfonated Polymeric Materials, 2002, Virginia Tech Intellectual Properties, Inc. (Book Not Supplied).

* cited by examiner

*Primary Examiner*—Thao T. Tran

(57) ABSTRACT

The present invention is directed to sulfonimide-containing polymers, specifically sulfonimide-containing poly(arylene ether)s and sulfonimide-containing poly(arylene ether sulfone)s, and processes for making the sulfonimide-containing poly(arylene ether)s and sulfonimide-containing poly (arylene ether sulfone)s, for use conductive membranes and fuel cells.

25 Claims, 1 Drawing Sheet

SULFONIMIDE-CONTAINING POLY(ARYLENE ETHER)S AND POLY(ARYLENE ETHER SULFONE)S, METHODS FOR PRODUCING THE SAME, AND USES THEREOF

This invention was made with government support under Contract No. DE-FC04-02AL67606 awarded by the U.S. Department of Energy. The government has certain rights in the invention.

FIELD OF THE INVENTION

The present invention is directed to sulfonimide-containing polymers, specifically sulfonimide-containing poly(arylene ether)s and sulfonimide-containing poly(arylene ether sulfone)s, and processes for making the sulfonimide-containing poly(arylene ether)s and sulfonimide-containing poly(arylene ether sulfone)s.

BACKGROUND

Polymer electrolyte membrane fuel cells (PEMFC) are expected to provide higher efficiencies, fewer environmental pollutants, and reduced operating and maintenance costs than traditional power sources. An important component of a PEMFC is a polymer electrolyte membrane (PEM). The range of potential candidates for use as membrane materials in PEMFCs is limited by a number of requirements, including chemical and mechanical stability, high ionic conductivity, and low reactant permeability. Developments have been made in the use of sulfonic acid functionalized polymers, including membranes such as Nafion® perfluorosulfonic acid membranes.

Known membranes made from sulfonic acid functionalized polymers have been found to have inadequate performance at temperatures greater than 100° C. due, in part, to the dependence of the membranes on water for proton conduction. Above 100° C., pressure constraints limit the amount of water that can be used to hydrate a membrane. At relatively low levels of hydration, insufficient water is present within the membrane to transport protons. In addition to improved performance at higher temperatures, it is also desirable to have improved mechanical stability at such temperatures and decreased methanol permeability in membranes used in direct methanol fuel cells.

Alternatives to perfluorosulfonic acid membranes include membranes based on aromatic engineering polymers. Poly(arylene ether)s and poly(arylene ether sulfone)s are engineering polymers known for their chemical and thermal stability. Poly(arylene ether)s and poly(arylene ether sulfone)s can be sulfonated to produce sulfonic-acid functionalized aromatic polymers as disclosed, for example, by A. Noshay and L. M. Robeson in "Sulfonated Polysulfone", *J. Appl. Polym. Sci.* 20, p. 1885 (1976). However, due to relatively poor control inherent in the process, post-polymerization sulfonation can result in sulfonation on the most electron-rich aromatic rings, which are also the most activated to subsequent decomposition of the sulfonic acid. Additionally, only one sulfonic group per repeat unit is typically achieved.

Another method for producing sulfonic-acid functionalized aromatic polymers is by polymerizing sulfonated monomers, as disclosed, for example by F. Wang et. al, "Direct polymerization of sulfonated poly(arylene ether sulfone) random (statistical) copolymers: candidates for new proton exchange membranes", *Journal of Membrane Science* 197 (1–2), pp. 231–242 (2002). However, the proton conductivity of sulfonated aromatic polymers made by either post-sulfonation or polymerizing sulfonated monomers by either of the two methods discussed hereinabove is limited by the acid strength of the aromatic sulfonic acids, especially at low relative humidity.

A need remains for conductive membranes suitable for use in applications such as fuel cells. A need also remains for engineering polymers having the advantageous thermal properties found in poly(ether sulfones). For use as conductive membranes, it is also desirable that such polymers have adequate mechanical strength, improved conductivity at higher temperatures, e.g., above about 80° C. For some applications it is desired that the conductivity be higher than about 50 milliSiemans per centimeter (mS/cm.).

SUMMARY OF THE INVENTION

One aspect of the present invention is a process for making a polymer, comprising polymerizing a compound having the formula:

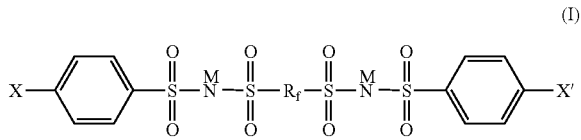

(I)

wherein $R_f$ is a straight chain, branched or cyclic, poly- or per-halogenated alkylene having from 1 to 20 carbon atoms and optionally substituted with one or more ether oxygens, M is a monovalent cation, and X and X' are each independently nucleophilic groups selected from OH and SH or leaving groups selected from F, Cl and $NO_2$. In some embodiments, one of X and X' is a leaving group and the other of X and X' is a nucleophilic group. In some embodiments, both of X and X' are nucleophilic groups. In some embodiments, both of X and X' are leaving groups. In some preferred embodiments, $R_f$ is perfluorinated, and X and X' are both F. In some preferred embodiments, M is potassium. In other preferred embodiments, M is sodium.

Another aspect of the present invention is a process for making a polymer comprising contacting compound having the formula:

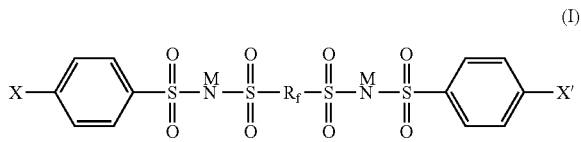

(I)

and a first comonomer, under conditions such that said comonomer and said compound polymerize, wherein $R_f$ is a straight chain, branched or cyclic, poly- or per-halogenated alkylene having from 1 to 20 carbon atoms and optionally substituted with one or more ether oxygens, M is a monovalent cation, and X and X' are each independently nucleophilic groups selected from OH and SH or leaving groups selected from F, Cl and $NO_2$ and said comonomer is an aromatic compound having either nucleophilic groups or leaving groups. In some embodiments, one of X and X' is a leaving group and the other of X and X' is a nucleophilic group. In some embodiments, both of X and X' are nucleophilic groups. In some embodiments, both of X and X' are leaving groups. In some preferred embodiments, $R_f$ is perfluorinated, and X and X' are both F. In some preferred embodiments, M is potassium. In other preferred embodiments, M is sodium. In preferred embodiments, the comonomer is a diol or a dithiol.

Another aspect of the present invention is a polymer, as well as a conductive membrane comprising the polymer, wherein the polymer comprises as polymerized units:

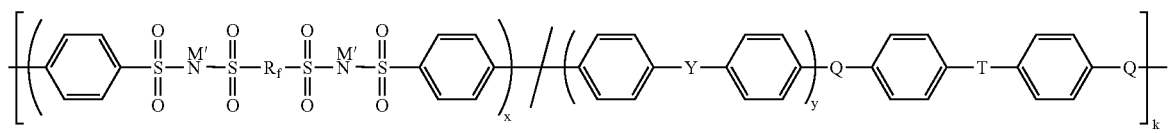

wherein k is an integer indicating the number of repeat units in the polymer, the quantity x/(x+y) is from greater than 0 to about 1, and in some embodiments x/(x+y) is 1, Q is O or S, $R_f$ is a straight chain, branched or cyclic, poly- or per-halogenated alkylene having from 1 to 20 carbon atoms and optionally substituted with one or more ether oxygens, M' is a cation, Y is selected from —S—, —S(O)—, —S(O)$_2$—, —C(O)—, —P(O)(C$_6$H$_5$)—, and combinations thereof, and T is a carbon-carbon single bond or is selected from C(CH$_3$)$_2$—, C(CF$_3$)$_2$—, C(CF$_3$)(C$_6$H$_5$)—, —C(O)—, S(O)$_2$—, and P(O)(C$_6$H$_5$)—. In some embodiments, M' is a monovalent cation, preferably selected from H, Li, Na and K. In other embodiments, M' is not a monovalent cation and is a cation that is introduced into the polymer by ion exchange following polymerization. In some embodiments, M' can be selected from multivalent cations, such as, for example, Mg, Ca and Al. Ion exchange to replace a monovalent cation with, for example, a divalent cation, may be desirable in some applications where reduced solubility of the polymer is preferred. In some preferred embodiments, the quantity x/(x+y) is from about 0.2 to about 0.6. With respect to the conductive membrane, in some preferred embodiments, the quantity x/(x+y) is from about 0.2 to about 0.6. In some preferred embodiments, M' is H. In some preferred embodiments, M' is Li.

A further aspect of the present invention is a polymer having the formula:

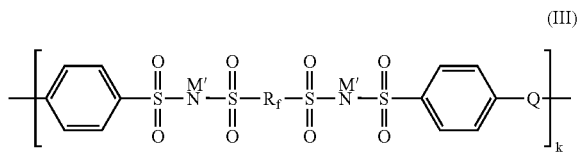

wherein k is an integer indicating the number of repeat units in the polymer, Q is O or S, $R_f$ is a straight chain, branched or cyclic, poly- or per-halogenated alkylene having from 1 to 20 carbon atoms and optionally substituted with one or more ether oxygens, M' is a cation. In some embodiments, M' is a monovalent cation, preferably selected from H, Li, Na and K. In other embodiments, M' is not a monovalent cation and is a cation that is introduced into the polymer by ion exchange following polymerization. In some embodiments, M' can be selected from multivalent cations, such as, for example, Mg, Ca and Al. Ion exchange to replace a monovalent cation with, for example, a divalent cation, may be desirable in some applications where reduced solubility of the polymer is preferred.

A further aspect of the invention is a fuel cell comprising a conductive membrane, in which the conductive membrane comprises a polymer having the formula:

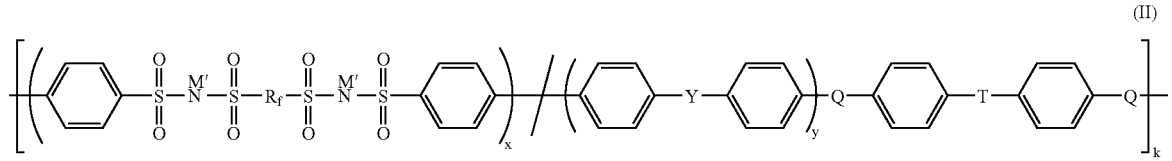

wherein k is an integer indicating the number of repeat units in the polymer, the quantity x/(x+y) is from greater than 0 to about 1, and in some embodiments x/(x+y) is. 1, Q is O or S, $R_f$ is a straight chain, branched or cyclic, poly- or per-haolgenated alkylene having from 1 to 20 carbon atoms and optionally substituted with one or more ether oxygens, M' is H, Y is selected from —S—, —S(O)—, —S(O)$_2$—, —C(O)—, —P(O)(C$_6$H$_5$)—, and combinations thereof, and T is a carbon-carbon single bond or is selected from C(CH$_3$)$_2$—, C(CF$_3$)$_2$—, C(CF$_3$)(C$_6$H$_5$)—, —C(O)—, S(O)$_2$—, and —P(O)( In some preferred embodiments, the quantity x/(x+y) is from about 0.2 to about 0.6.

These and other aspects of the invention will be apparent to those skilled in the art in view of the following disclosure and the appended claims.

DETAILED DESCRIPTION

Figure 1:
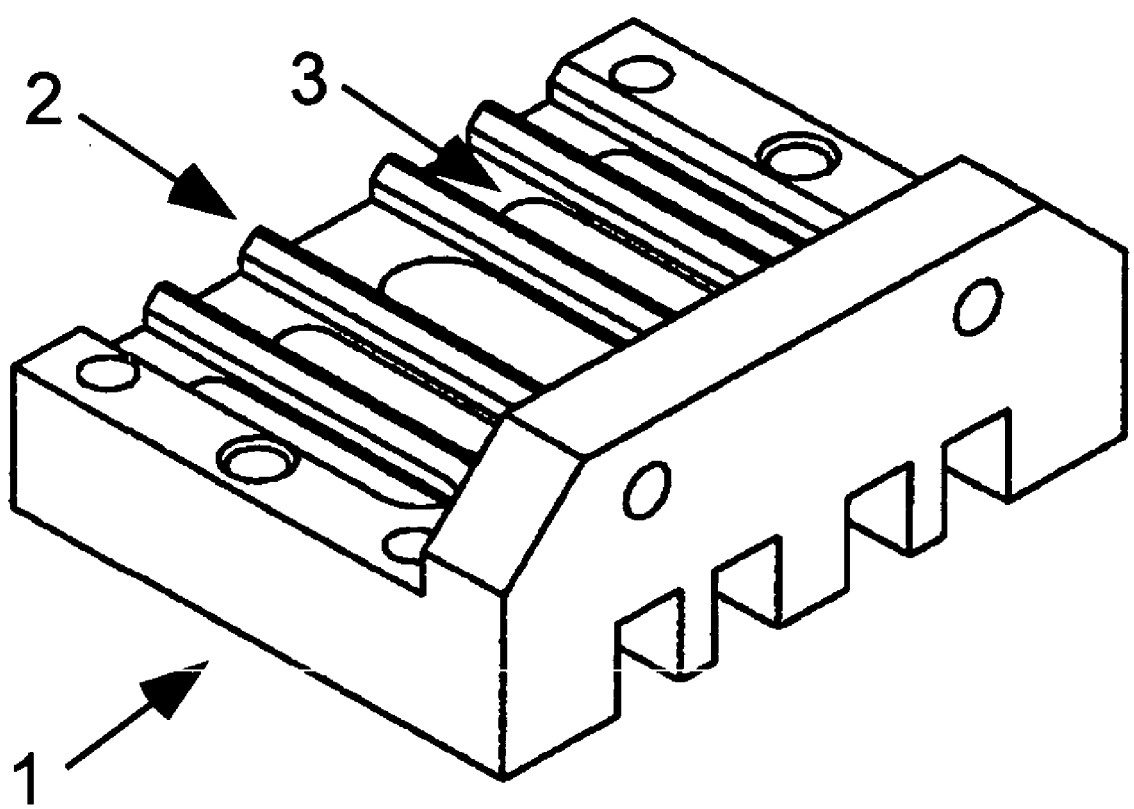
FIG. 1 is a side view of an embodiment of the in-plane conductivity measurement apparatus as described in the Examples.

It has now been found that sulfonimide groups can be incorporated into poly(arylene ether)s and poly(arylene ether sulfone)s. The present invention thus provides sulfonimide-containing polymers, specifically sulfonimide-containing poly(arylene ether)s and sulfonimide-containing poly(arylene ether sulfone)s, and processes for making the sulfonimide-containing poly(arylene ether)s and sulfonimide-containing poly(arylene ether sulfone)s.

The processes for making the sulfonimide-containing polymers utilize certain sulfonimide-containing monomers, which have the following formula:

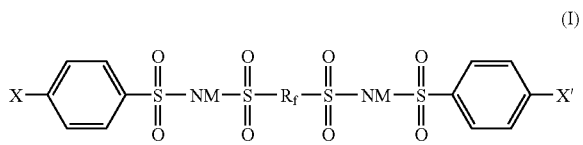

(I)

wherein $R_f$ is a straight chain, branched or cyclic, poly- or per-halogenated alkylene having from 1 to 20 carbon atoms and optionally substituted with one or more ether oxygens; M is a monovalent cation; and X and X' are each independently nucleophilic groups selected from OH and SH or leaving groups selected from F, Cl and $NO_2$. By "leaving group" is meant a group that can be displaced in, for example, nucleophilic substitution reactions. By "nucleophilic group" is meant a group that is electron-rich, wherein it can donate electrons during a chemical reaction.

In some embodiments, one of X and X' is a leaving group as defined hereinabove and the other of X and X' is a nucleophilic group as defined hereinabove. In such embodiments, polymerization of monomer (I) can be carried out in the absence of a comonomer, and will produce a polymer having the formula:

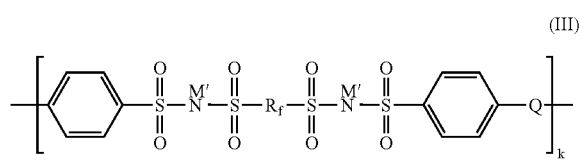

(III)

wherein k is an integer indicating the number of repeat units in the polymer, Q is O or S, $R_f$ is a straight chain, branched or cyclic, poly- or per-haolgenated alkylene having from 1 to 20 carbon atoms and optionally substituted with one or more ether oxygens, M' is a cation. In some embodiments, M' is a monovalent cation, preferably selected from H, Li, Na and K. In other embodiments, M' is not a monovalent cation and is a cation that is introduced into the polymer by ion exchange following polymerization. In some embodiments, M' can be selected from multivalent cations, such as, for example, Mg, Ca and Al. Ion exchange to replace a monovalent cation with, for example, a divalent cation, may be desirable in some applications where reduced solubility of the polymer is preferred.

According to the processes disclosed herein, when one of X and X' is a leaving group and the other of X and X' is a nucleophilic group, both as defined hereinabove, the monomer (I) can be homopolymerized to form a sulfonimide-containing polymer. Such a polymer is referred to herein as a "homopolymer".

Alternatively, the monomer (I) can be copolymerized with a first comonomer that is aromatic and, optionally, one or more additional aromatic comonomers (a second comonomer). For example, monomer (I) can be copolymerized with a first aromatic comonomer and a second aromatic comonomer. The number and composition of the additional monomers can be selected by one skilled in the art depending, for example, on the desired properties of the polymer.

Polymers formed by copolymerization of (I) with at least a first comonomer are referred to herein as "copolymers". For example, when both X and X' are nucleophilic groups, the monomer can be copolymerized with another aromatic monomer having two leaving groups. Preferably, such leaving groups are selected from F, Cl and $NO_2$. As another example, when both X and X' are leaving groups, the monomer can be copolymerized with another aromatic monomer having two nucleophilic groups selected. Preferably, such nucleophilic groups are selected from OH and SH. Also preferably, when both X and X' are leaving groups, they are both F.

The monovalent cation M can be selected from metal ions that can form salts, including alkali metals, and hydrogen. Preferred monovalent cations are H, Li, Na and K. In some highly preferred embodiments, M is potassium.

Monomer (I) can be prepared by treatment of 1,4-octafluorbutane bissulfonyl fluoride with 4-fluorobenzenesulfonamide in the presence of diisopropylethylamine in acetonitrile, using known methods. A method that can be adapted for such synthesis is disclosed by DesMarteau et al., in "New sulfonimide acid containing perfluorocyclobutane (PFCB) aromatic polyethers for potential use in fuel cell applications", Polym. Mat. Sci. Eng. 83, pp. 25–26 (2000), and in "New aromatic perfluorovinyl ether monomers containing the sulfonimide acid functionality", Polym. Mat. Sci. Eng. 83, pp. 10–11 (2000), the disclosures of which are incorporated herein by reference.

Generally, 1,4-octafluorbutane bissulfonyl fluoride is treated with 4-fluorobenzenesulfonamide in the presence of a base in a polar solvent, or alternatively, in the absence of solvent, followed by ion-exchange. An exemplary synthesis can be represented schematically as follows:

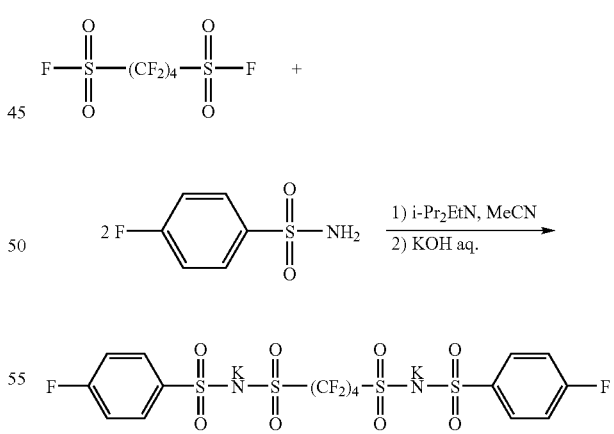

Modifications can be made by one skilled in the art in order to produce compounds in which the terminal fluorine atoms are replaced by, for example, $NO_2$, Cl, OH or SH. Also, K can be replaced by other monovalent cations as represented by M, defined hereinabove.

To make the sulfonimide-containing polymers, monomer (I) can be polymerized in the presence of a diol in a suitable solvent to obtain a polymer having the formula:

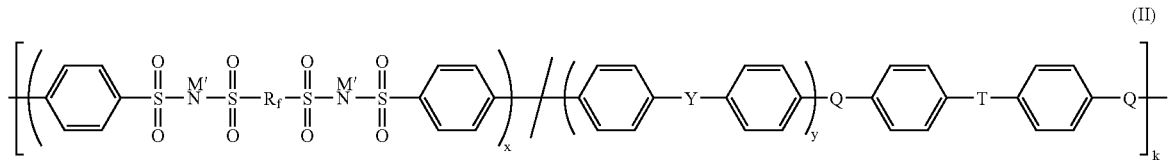

wherein k is an integer indicating the number of repeat units in the polymer, the quantity x/(x+y) is from greater than 0 to about 1, and in some embodiments x/(x+y) is 1, Q is O or S, $R_f$ is a straight chain, branched or cyclic, poly- or per-haolgenated alkylene having from 1 to 20 carbon atoms and optionally substituted with one or more ether oxygens, M' is a cation, Y is selected from —S—, —S(O)—, —S(O)$_2$—, —C(O)—, —P(O)(C$_6$H$_5$)—, and combinations thereof, and T is a carbon-carbon single bond or is selected from C(CH$_3$)$_2$—, C(CF$_3$)$_2$—, C(CF$_3$)(C$_6$H$_5$)—, —C(O)—, S(O)$_2$—, and P(O)(C$_6$H$_5$)—. In some embodiments, M' is a monovalent cation, preferably selected from H, Li, Na and K. In other embodiments, M' is not a monovalent cation and is a cation that is introduced into the polymer by ion exchange following polymerization. In some embodiments, M' can be selected from multivalent cations, such as, for example, Mg, Ca and Al. ion exchange to replace a monovalent cation with, for example, a divalent cation, may be desirable in some applications where reduced solubility of the polymer is preferred. For example for use in separations, where water insolubility is desired, replacement of a monovalent cation with Mg, Ca, or Al may be preferred.

In copolymers, as defined herein, the quantity x/(x+y) is preferably from about 0.2 to about 0.6. In forming copolymers, monomer (I) is polymerized with at least a first comonomer, by condensation polymerization as described hereinbelow. The first comonomer is an aromatic compound having two nucleophilic groups. Preferred nuceleophilic groups are —OH and —SH. In some preferred embodiments, the first comonomer used in polymerizing monomer (I) is an aromatic diol. In other embodiments, the first comonomer is an aromatic dithiol.

Highly preferred first comonomers are compounds known as biphenols having the formula

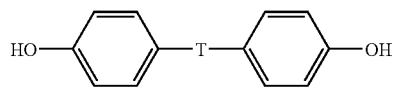

in which T is a carbon-carbon single bond or is selected from C(CH$_3$)$_2$—, C(CF$_3$)$_2$—, C(CF$_3$)(C$_6$H$_5$)—, —C(O)—, S(O)$_2$—, and —P(O)(C$_6$H$_5$)—. Even mo preferably, T is a carbon-carbon single bond.

In addition to the first comonomer monomer (I) can be polymerized with one or more halogen-substituted or nitro-substituted aromatic monomers as additional comonomers, to form a polymer of formula (II) wherein the quantity x/(x+y) is from greater than 0 to about 1, and in some embodiments x/(x+y) is 1, i.e. a copolymer, as defined herein. In (II), x represents the mole fraction of units derived from monomer (I) in the copolymer, y represents the mole fraction of units derived from the optional comonomer and k is an integer preferably from 1 through 100,000 and indicates the number of combined monomer (I) and comonomer units in the polymer. Examples of optional comonomers include dichloro- or difluoro-substituted or dinitro-aromatic monomers. Preferred comonomers are compounds of the formula:

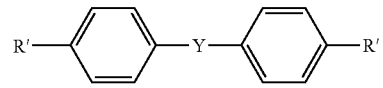

wherein Y is selected from —S—, —S(O)—, —S(O)$_2$—, —C(O)—, —P(O)(C$_6$H$_5$)—, and combinations thereof; and R' is F, Cl, dichloro-, difluoro-, dinitroaromatic substitutions and combinations thereof. A preferred comonomer is chlorophenylsulfone.

The amount of comonomer can be selected by one skilled in the art, depending in part upon the properties desired in the copolymer. In some preferred embodiments, the amount of comonomer is within the range from about 40 mole percent to about 80 mole percent.

The polymerization to form homopolymers or copolymers can be carried out using condensation polymerization methods known to those skilled in the art. Preferably, the polymerization is conducted in the presence of a base of sufficient strength to cause substantial ionization of the diol. For example, alkaline metal carbonates, hydrogen carbonates, and hydroxides can be used as bases. Preferably, the polymerization is a potassium carbonate mediated condensation polymerization.

The reaction between monomer (I) and the diol can be broadly characterized as a nucelophilic substitution polymerization reaction. Nucleophilic substitution reactions, as is known to those skilled in the art, involve the reaction of a compound containing a leaving group with a compound containing a nucleophilic group. In the processes disclosed herein, it is preferred that the ratio of the total number of leaving groups to the total number of nucelophilic groups is 1:1. While the ratio of leaving groups to nucleophilic groups can be different from 1:1, such variations can limit the molecular weight in the polymer formed and thus may not be desirable where it is desired to obtain a higher molecular weight. Solvents useful for the polymerization include dimethyl formamide, dimethyl acetamide, diphenyl sulfone, dimethyl sulfoxide, and NMP. NMP is preferred. Generally, higher-boiling polar solvents, such as, for example, solvents having boiling points greater than about 140° C., are useful in the polymerization. The polymer can be recovered by conventional methods such as, for example, coagulation.

Homopolymers and copolymers prepared from monomers (I) are suitable for use as conductive membranes. To form conductive membranes, the polymers are polymerized in the presence of a base, and are obtained in salt form, the composition of which depends upon the base. When the polymers are synthesized in the presence of potassium carbonate, the polymers are obtained in the form of a potassium salt, and films can be cast in salt form. The salt form can then be treated with a strong acid, such as hydrochloric acid, nitric acid or sulfuric acid, to obtain an acid form. The acid forms of the membranes are useful as proton conductive membranes.

Conductive membranes of the sulfonimide-containing polymers are useful in making fuel cells. Fuel cells are typically formed as stacks or assemblages of membrane electrode assemblies, and preferably include a coated substrate such as a conductive membrane, an anode and cathode, and other optional components. Electrocatalysts in the anode and the cathode typically induce the desired electrochemical reactions. The fuel cells typically also include a porous, electrically conductive membrane that is in electrical contact with each of the electrodes, and permits diffusion of the reactants to the electrodes. The sulfonimide-containing polymers can be used in making the conductive membrane.

In an exemplary embodiment of a fuel cell using conductive membranes containing sulfonimide polymers, the fuel cell is in the form of an assembly including the membrane, and gas diffusion backings that have an electrocatalyst composition coated either on the membrane or the gas diffusion backings or on both. Such an assembly may be referred to as a membrane electrode assembly ("MEA"). Bipolar separator plates, made of a conductive material and providing flow fields for the reactants, are placed between a number of adjacent MEAs. A number of MEAs and bipolar plates are assembled in this manner to provide a fuel cell stack.

For the electrodes to function effectively in the fuel cells, effective anode and cathode electrocatalyst sites are provided. Effective anode and cathode electrocatalyst sites have several desirable characteristics: (1) the sites are accessible to the reactant, (2) the sites are electrically connected to the gas diffusion layer, and (3) the sites are ionically connected to the fuel cell electrolyte.

It is desirable to seal reactant fluid stream passages in a fuel cell stack to prevent leaks or inter-mixing of the fuel and oxidant fluid streams. Fuel cell stacks typically employ fluid tight resilient seals, such as elastomeric gaskets between the separator plates and membranes. Such seals typically circumscribe the manifolds and the electrochemically active area. Sealing can be achieved by applying a compressive force to the resilient gasket seals. Compression enhances both sealing and electrical contact between the surfaces of the separator plates and the MEAs, and sealing between adjacent fuel cell stack components. In conventional fuel cell stacks, the fuel cell stacks are typically compressed and maintained in their assembled state between a pair of end plates by one or more metal tie rods or tension members. The tie rods typically extend through holes formed in the stack end plates, and have associated nuts or other fastening means to secure them in the stack assembly. The tie rods may be external, that is, not extending through the fuel cell plates and MEAs, however, external tie rods can add significantly to the stack weight and volume. It is generally preferable to use one or more internal tie rods that extend between the stack end plates through openings in the fuel cell plates and MEAs as described in U.S. Pat. No. 5,484, 666. Typically resilient members are utilized to cooperate with the tie rods and end plates to urge the two end plates towards each other to compress the fuel cell stack.

The resilient members accommodate changes in stack length caused by, for example, thermal or pressure induced expansion and contraction, and/or deformation. That is, the resilient member expands to maintain a compressive load on the fuel cell assemblies if the thickness of the fuel cell assemblies shrinks. The resilient member may also compress to accommodate increases in the thickness of the fuel cell assemblies. Preferably, the resilient member is selected to provide a substantially uniform compressive force to the fuel cell assemblies, within anticipated expansion and contraction limits for an operating fuel cell. The resilient member can comprise mechanical springs, or a hydraulic or pneumatic piston, or spring plates, or pressure pads, or other resilient compressive devices or mechanisms. For example, one or more spring plates can be layered in the stack. The resilient member cooperates with the tension member to urge the end plates toward each other, thereby applying a compressive load to the fuel cell assemblies and a tensile load to the tension member.

Conductive membranes of the sulfonimide-containing polymers in which M' is lithium are useful in making batteries. In an exemplary embodiment of a battery using conductive membranes containing sulfonimide polymers, the battery is in the form of an assembly including the membrane, and at least one cathode, and at least one anode, and optionally a nonaqueous, polar, aprotic solvent. The electrodes generally comprise a metallic foil and particles of active material blended with a conductive diluent such as carbon black or graphite bound into a plastic material binder. Examples of suitable solvents include linear or cyclic ethers, esters, nitriles and sulfones.

EXAMPLES

Example 1

Monomer Synthesis

A. Perfluorobutane-1,4-bis-sulfonyl chloride

The method used is similar to that disclosed by Qiu et al., "A useful synthesis of ω-iodoperfluoroalkanesulfonyl fluorides and perfluoroalkane-α, ω-bis-sulfonyl fluorides, *J. Fluorine Chemistry* 60(1), pp. 93–100 (1993). A 1-liter, three-neck round bottom flask, fitted with a gas inlet, magnetic stirrer, and addition funnel was charged with sodium bicarbonate (40.3 g, 485 mmol), $Na_2S_2O_4$ (100 g, 485 mmol), water (deoxygenated), and 250 mL acetonitrile. The additional funnel was charged with 1,4-diiodoperfluorobutane (100 g, 220 mmol) in 50 mL acetonitrile. The contents of the additional funnel were added drop-wise over 2 hrs to control the $CO_2$ evolution. The material in the flask was then let to stir overnight. The volatiles were removed via reduced pressure rotary evaporation with slow heating to 70° C. The remaining residue was dissolved in 500 mL water and analyzed by NMR ($^{19}$F NMR; $D_2O$; −122.9 and −130.4 ppm). The water solution was cooled to 0° C. with a brine/water ice bath with $Cl_2$ bubbled in, keeping the temperature around 0° C. The reaction went from dark yellow to orange/brown and to brown/black before finally turning mustard yellow with a yellow solid. The solids were collected by filtration through a coarse glass fritted funnel, rinsed with water and dissolved in methylene chloride. The organic solution was then washed with brine two times and the minimal amount of emulsified material discarded with the wash water. The methylene chloride layer was dried over magnesium sulfate, and the solvent removed via reduced pressure rotary evaporation. The residue was dried under house vacuum overnight. $^{19}$F NMR; $CDCl_3$; −104.8 and −119.3 ppm. Yield of crude product −76.5 g; 87%.

The crude product was dissolved in 350 mL anhydrous acetonitrile and transferred to a 1-liter three-neck round bottom flask fitted with a gas inlet and two septa. Anhydrous potassium fluoride (44.5 g, 768 mmol) was quickly measured out on the bench top (no glove box was used) and transferred to the flask under $N_2$ purge. The reaction was stirred under $N_2$ over four days and monitored by $^{19}F$ NMR. Water (500 mL) was added to the reaction mass and the reaction mass transferred to a separatory layer, a layer of solids, and the aqueous layer. The bottom layer was removed attempting to keep the solids behind, crude yield=61 g. The bottom layer, an orange oil with some solids, was washed with ~25 mL water and filtered through a 0.2 micron syringe filter. Distillation under house vacuum yielded 58.24 g (83%) of a clear, colorless liquid ($^{19}$FNMR (d-CDCl$_3$) 46.8, −108.2, −120.1 ppm). $^1$H NMR (d-CDCl$_3$) revealed a small amount of acetonitrile and a small amount of terminal —CF$_2$H.

B. Perfluorobutane-1,4-bis-4-fluorophenylsulfonimide-bis-potassium-salt

A 250 mL three-neck round bottom flask, fitted with a gas inlet, magnetic stirrer, and two septa, was charged with 4-fluorobenzenesulfonamide (17.3 g, 99 mmol), 50 mL anhydrous acetonitrile, and diisopropylethylamine (37 g, 287 mmol). Perfluorobutane-1,4-bis-sulfonyl fluoride (15.0 g, 41 mmol) was then added dropwise and stirred at room temperature over 48 hours. Volatiles were removed under reduced pressure rotary evaporation at 70° C. The residue was dissolved in 50 mL acetonitrile and 50 mL conc. HCl added with stirring. The mixture was again concentrated to a viscous brown oil and the residue poured slowly into 600 mL stirred 20% KOH in an ice bath resulting in precipitation of a tan solid. The flask was rinsed with 200 ml 50/50 methanol/water and this solution also poured slowly into the KOH solution. The solids were collected by filtration, dissolved in a mixture of 400 mL H$_2$O and 100 mL methanol. The solution was heated to reflux and stirred with carbon black for 20 minutes followed by filtration through celite. The solution was evaporated to ~400 mL and the solids crystallized at RT overnight. The white crystals were collected by filtration and dried in a vacuum oven at 100° C. overnight. Yield=91%, NMR (d-MeOH) $^1$H 7.2 (triplet, 2H); 7.95 (quartet, 2H) ppm. $^{19}$F −112.26 (septet, 1F); −115.41 (multiplet, 2F); −122.89 (multiplet, 2F) ppm. Elemental analysis Theory/(Actual): C, 25.53(25.72); H, 1.07(1.18); N, 3.72(3.87); F, 25.24(25.08); S, 17.04(17.00).

Example 2

A 100 mL 3-neck round bottom flask fitted with a gas inlet, mechanical stirrer, Dean Stark trap (10 mL volume) and water condenser was purged with nitrogen for 30 minutes and charged with 7.527 g (10 mmol) of the monomer (I) obtained in Example 1, 1.862 g (10 mmol) biphenol (Aldrich, crystallized from methanol and dried in a vacuum oven at 80° C. overnight), and 7.87 g (7.25 mmol) potassium carbonate (Aldrich, anhydrous), each weighed in weight boats. The weight boats were rinsed with NMP (Aldrich, distilled from CaH$_2$) and additional NMP was added to bring the total volume to 20 mL followed by 18 mL toluene (Aldrich, anhydrous). The Dean Stark trap was filled with 7 mL toluene. The reaction mixture was placed in an oil bath and the bath heated to 170° C. for 2 hours. Approximately 5 mL of the solution in the Dean Stark trap was drained off and the reaction mixture in the flask was heated for an additional 2 hours at an oil bath temperature of 170° C. The oil bath temp was then raised to 200° C. and the contents of the Dean Stark trap drained after 20 minutes. Heating with an oil bath at a temperature of 200° C. was continued for 16 hours, after which the oil bath temperature was brought to 210° C. and maintained there for 2 additional hours. The oil bath was then removed and after about 5 minutes the hot reaction mixture was poured into slowly stirred concentrated HCl to coagulate the polymer. The polymer was dried under vacuum overnight then dissolved in 200 mL 50/50 isopropanol/water. The solution was poured into 500 MW cut-off dialysis tubing and then dialyzed against water for 30 hours, 0.1 M HCl for 2 hours, followed by water for 72 hours with the water replaced four times. The solution in the tubing was then concentrated to ⅓ its volume by rotary evaporation. Polymer films were cast directly from the evaporated solution on glass plates. Inherent viscosity of the dry polymer in NMP at 25° C.=3.090 dl/g, characterized by multi-nuclear NMR.

Example 3

Synthesis of copolymer with x=0.30 and y=0.70

A 100 mL 3-neck round bottom flask fitted with a gas inlet, mechanical stirrer, Dean Stark trap (10 mL volume) and water condenser was purged with N2 for 30 minutes and charged with 2.258 g (3 mmol) perfluorobutane-1,4-bis-4-fluorophenylsulfonimide-bis-potassium salt, 2.010 g (7 mmol) chlorophenylsulfone (Aldrich, crystallized from methanol and dried in a vacuum oven at 80 C overnight), 1.862 g (10 mmol) biphenol (Aldrich, crystallized from methanol and dried in a vacuum oven at 80 C overnight), and 7.87 g (7.25 mmol) potassium carbonate (Aldrich, anhydrous). The weight boats were rinsed with NMP and additional NMP added to bring the total volume to 20 mL (Aldrich, distilled from CaH$_2$) followed by 18 mL toluene (Aldrich, anhydrous). The Dean Stark trap was filled with 7 mL toluene. The reaction mixture was placed in an oil bath and the bath heated to 170° C. for 2 hours. Approximately 5 mL of the solution in the Dean Stark trap was drained off and the reaction mixture heated for an additional 2 hours at an oil bath temperature of 170° C. The oil bath temp was then raised to 200° C. and the contents of the Dean Stark trap drained after 20 minutes. Heating with an oil bath temperature of 200° C. was continued for 16 hours after which the oil bath temperature was brought to 210° C. for 2 additional hours. The oil bath was then removed and after about 5 minutes the hot reaction mixture was poured into slowly stirred water to coagulate the polymer. The water was replaced with fresh water 5 times over 24 hours and the polymer then dried in a vacuum oven at 100° C. overnight. Yield was 90%, characterized by multi-nuclear NMR. Other copolymers were synthesized by varying the ratio of (I) to chlorophenylsulfone according to the following table. Typical yields were greater than 85%. Inherent viscosities were obtained in NMP at 25° C. Polymer membranes were cast from DMAC solutions in aluminum weight pans and dried in a vacuum oven at 80° C. for 24 hours. The films were then converted to their acid form by either boiling in 1M HCl for 2 hours followed by boiling in water for 2 hours, or by soaking in 1M HCl for 24 hours followed by water for 24 hours.

TABLE 1

Properties of copolymer as function of molar ratio of monomer (I) to chlorophenylsulfone comonomer

| Molar ratio (I):chlorophenylsulfone | (I) (g) | Chlorophenylsulfone (g) | Inherent Viscosity (dl/g) |
|---|---|---|---|
| 2:8 | 1.5054 | 2.2973 | 0.611 |
| 2.5:7.5 | 1.8817 | 2.1537 | 0.729 |
| 3:7 | 2.2581 | 2.0101 | 1.509 |
| 3.5:6.5 | 2.6344 | 1.8665 | 0.895 |
| 4:6 | 3.0108 | 1.7230 | 1.393 |
| 5:5 | 3.7635 | 1.4358 | 2.160 |
| 6:4 | 4.5161 | 1.1486 | 2.459 |
| 8:2 | 6.0215 | 0.5732 | 1.861 |

Example 4

The copolymer from Example 3 in which the molar ratio of (I) to chlorophenylsulfone was 3:7 was tested for proton conductivity. A membrane was cast in potassium salt form in DMAC, and the acid form of the membrane was obtained by treating the potassium form with dilute hydrochloric acid. Treatment included dissolving the polymer in DMAC at 1 g per 10 mL and filtering. The solution was poured into weighing pans and placed in a vacuum oven at room temperature overnight. The oven temperature was maintained at about 80° C. overnight. The resulting membrane in the pans was soaked in water until able to be removed. The membranes were boiled in 1 M hydrochloric acid for 2 hours, followed by boiling in fresh water for 2 hours; or soaked in 1M hydrochloric acid for 24 hours, then soaked in fresh water for 24 hours at room temperature. The membrane had a conductivity of 156 mS/cm at 80° C. and 95% relative humidity, as measured by in-plane conductivity measurements, described below. Results of conductivity measurements are shown in Table 2.

Water swelling was also measured as an indicator of the membrane dimensional stability between the wet and dry states. Membranes were soaked in distilled water over 24 hours at 25° C., the excess water was removed by blotting with a paper towel. The wet membranes were weighed, dried in a vacuum oven for 24 hours at 48° C., and the dry weight was recorded. Swelling is reported as (wet weight-dry weight)/dry weight. Water swelling data is included in Table 2.

In-Plane Conductivity Measurement Technique

The in-plane conductivity of membranes was measured under conditions of controlled relative humidity and temperature by a technique in which the current flowed parallel to the plane of the membrane. A four-point probe technique was used similar to that described in an article entitled "Proton Conductivity of Nafion® 117 As Measured by a Four-Electrode AC Impedance Method" by Y. Sone et al., J. Electrochem. Soc., 143, 1254 (1996), which is herein incorporated by reference. Referring to FIG. 1, a lower fixture 1 was machined from annealed glass-fiber reinforced PEEK to have four parallel ridges 2 containing grooves that supported and held four 0.25 mm diameter platinum wire electrodes. The distance between the two outer electrodes was 25 mm, while the distance between the two inner electrodes was 10 mm. A strip of membrane was cut to a width between 10 and 15 mm, a length sufficient to cover and extend slightly beyond the outer electrodes, and placed on top of the platinum electrodes. An upper fixture (not shown), which had ridges corresponding in position to those of the bottom fixture, was placed on top and the two fixtures clamped together so as to push the membrane into contact with the platinum electrodes. The fixture containing the membrane was placed in a small pressure vessel (pressure filter housing) that was in turn placed in a forced-convection thermostated oven (25 to 180° C.) and the temperature within the vessel was measured by a thermocouple. Water was fed from a calibrated Waters 515 HPLC pump (Waters Corporation, Milford, Mass.) and combined with dry air fed from a calibrated mass flow controller (200 sccm maximum) to evaporate the water within a coil of 1.6 mm diameter stainless steel tubing inside the oven. The resulting humidified air was then fed into the inlet of the pressure vessel. The total pressure within the vessel (100 to 345 kPa) was adjusted by means of a pressure-control let-down valve on the outlet and measured using a capacitance manometer (Model 280E, Setra Systems, Inc., Boxborough, Mass.). The relative humidity was calculated assuming ideal gas behavior using tables of the vapor pressure of liquid water as a function of temperature, the gas composition from the two flow rates, the vessel temperature, and the total pressure. Slots 3 in the lower and upper parts of the fixture allowed access of humidified air to the membrane for rapid equilibration with water vapor. Current was applied between the outer two electrodes while the resultant voltage was measured between the inner two electrodes. The real part of the AC impedance (resistance) between the inner two electrodes, R, was measured at a frequency of 1 kHz using a potentiostat/frequency response analyzer (PC4/750™ with EIS software, Gamry Instruments, Warminster, Pa.). The conductivity, κ, was calculated as $$\kappa = 1.00 \text{ cm}/(R \times t \times w),$$

where t was the thickness of the membrane and w was its width (both in cm).

TABLE 2

Conductivity and water swelling of copolymer as a function of ratio of monomer (I) to chlorophenylsulfone

| Molar ratio (I):chlorophenyl-sulfone | Boiled or RT Soak | Temperature (C.) | Relative Humidity (%) | Water Swelling (%) | Conductivity (mS/cm) |
|---|---|---|---|---|---|
| 2:8 | RT soak | 80 | 95 | 15 | 22 |
| 2:8 | boiled | 80 | 95 | 21 | 36 |
| 2.5:7.5 | RT soak | 80 | 95 | 24 | 52 |
| 2.5:7.5 | boiled | 80 | 95 | 29 | 73 |
| 3:7 | RT soak | 80 | 95 | | 100 |
| 3:7 | boiled | 80 | 95 | 35 | 156 |

TABLE 2-continued

Conductivity and water swelling of copolymer as a function of ratio of monomer (I) to chlorophenylsulfone

| Molar ratio (I):chlorophenyl-sulfone | Boiled or RT Soak | Temperature (C.) | Relative Humidity (%) | Water Swelling (%) | Conductivity (mS/cm) |
|---|---|---|---|---|---|
| 3.5:6.5 | RT soak | 80 | 95 | 30 | 179 |
| 4:6 | RT soak | 80 | 95 | 32 | 210 |
| 5:5 | RT soak | 80 | 95 | 39 | 231 |

What is claimed is:

1. A process for making a polymer comprising polymerizing a compound having the formula:

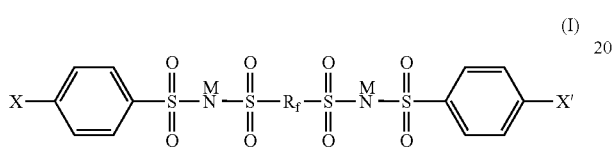

wherein $R_f$ is a straight chain, branched or cyclic, poly- or per-halogenated alkylene having from 1 to 20 carbon atoms and optionally substituted with one or more ether oxygens, M is a monovalent cation, and X and X' are each Independently OH, SH, F, Cl or $NO_2$.

2. The process of claim 1 wherein $R_f$ is perfluorinated.

3. The process of claim 1 wherein X and X' are both F.

4. The process of claim 1 wherein M is potassium.

5. The process of claim 1 wherein M is sodium.

6. The process of claim 1 wherein said polymerizing comprises contacting said compound with a first comonomer under such conditions that said compound and said first comonomer copolymerize.

7. The process of claim 6 wherein said first comonomer is a biphenol.

8. The process of claim 6, further comprising contacting said monomer and said first comonomor with a second comonomer.

9. The process of claim 6 wherein said first comonomer has the formula:

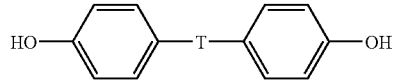

wherein T is a carbon-carbon single bond or is selected from the group consisting of $C(CH_3)_2$—, $C(CF_3)_2$—, $C(CF_3)(C_6H_5)$—, —C(O)—, $S(O)_2$—, and —P(O)($C_6H_5$)—.

10. The process of claim 8 wherein said second comonomer has the formula:

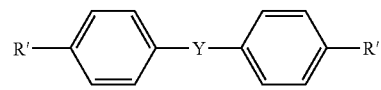

wherein Y is selected from —S—, —S(O)—, —S(O)$_2$—, —C(O)—, —P(O)($C_6H_5$)—, and combinations thereof; and R' is F, Cl, dichloro-, difluoro-, dinitroaromatic substitutions and combinations thereof.

11. A polymer comprising as polymerized units:

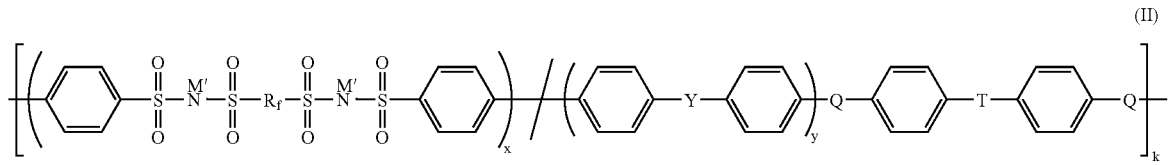

wherein k is an integer indicating the number of repeat units in the polymer, the quantity x/(x+y) is from greater than 0 to about 1, Q is O or S, $R_f$ is a straight chain, branched or cyclic, poly- or per-halogenated alkylene having from 1 to 20 carbon atoms and optionally substituted with one or more ether oxygens, M' is a cation, Y is selected from —S—, —S(O)—, —S(O)$_2$—, —C(O)—, —P(O)($C_6H_5$)—, and combinations thereof and T is a carbon-carbon single bond or is selected from $C(CH_3)_2$—, $C(CF_3)_2$—, $C(CF_3)(C_6H_5)$—, —C(O)—, $S(O)_2$—, and —P(O)($C_6H_5$)—.

12. The polymer of claim 11 wherein the quantity x/(x+y) is from about 0.2 to about 0.6.

13. The polymer of claim 11 wherein the quantity x/(x+y) is 1.

14. The polymer of claim 11, wherein M' is H.

15. The polymer of claim 11, wherein M' is Li.

16. A conductive membrane comprising a polymer of claim 11.

17. The conductive membrane of claim 16, said membrane having a conductivity of at least about 10 mS/cm at 80° C. and 95% relative humidity.

18. The conductive membrane of claim 16, said membrane having a conductivity of at least about 50 mS/cm at 80° C. and 95% relative humidity.

19. The conductive membrane of claim 16, said membrane having a water swellabitity of less than 100% at 25° C.

20. A fuel cell assembly comprising the conductive membrane of claim 16.

21. A polymer comprising as polymerized units:

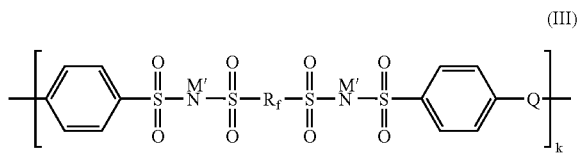

(III)

wherein k is an integer indicating the number of repeat units in the polymer, Q is O or S, $R_f$ is a straight chain, branched or cyclic, poly- or per-haolgenated alkylene having from 1 to 20 carbon atoms and optionally substituted with one or more ether oxygens, M' is a cation.

22. The polymer of claim 21, wherein M' is a monovalent cation.

23. The polymer of claim 22, wherein M' is H, Li, Na or K.

24. The polymer of claim 21, wherein more than one M' has been replaced by a multivalent cation.

25. The polymer of claim 24, wherein the multivalent cation is Mg, Ca or Al.

* * * * *